United States Patent
Carr

[11] Patent Number: 5,398,569
[45] Date of Patent: Mar. 21, 1995

[54] SNAP-IN PEDAL

[75] Inventor: James E. Carr, Waterford, Mich.

[73] Assignee: General Motors Corporation, Detroit, Mich.

[21] Appl. No.: 86,418

[22] Filed: Jul. 2, 1993

[51] Int. Cl.6 .......................... G05G 1/14; F16C 11/06
[52] U.S. Cl. ........................ 74/560; 74/562.5;
   74/512; 74/513; 403/151; 403/153; 403/154;
   403/166
[58] Field of Search .................. 74/560, 561, 512, 513,
   74/562.5; 403/151, 150, 153, 154, 166

[56] References Cited

U.S. PATENT DOCUMENTS

| | | | |
|---|---|---|---|
| 1,152,876 | 9/1915 | Brown et al. | 403/154 |
| 1,478,733 | 12/1923 | Cave | 403/151 |
| 1,511,135 | 10/1924 | Moser | 403/154 |
| 1,587,752 | 6/1926 | Brandt | 403/153 |
| 1,742,457 | 1/1930 | Wittman | 403/150 |
| 1,824,021 | 9/1931 | Kusebauch | 403/154 |
| 3,451,288 | 6/1969 | Barton et al. | 74/512 |
| 4,299,137 | 11/1981 | Malecha | 74/512 |
| 4,512,600 | 4/1985 | King | 403/166 X |
| 4,528,590 | 7/1985 | Bisacquino et al. | 74/513 X |
| 4,564,308 | 1/1986 | Ikegami et al. | 403/166 |
| 4,597,499 | 7/1986 | Hanula | 403/154 X |
| 4,819,500 | 4/1989 | Musumiya et al. | 74/513 |
| 5,168,771 | 12/1992 | Fujimori | 74/562.5 |
| 5,233,882 | 8/1993 | Byram et al. | 74/512 X |
| 5,289,758 | 3/1994 | Berlinger | 403/150 X |

FOREIGN PATENT DOCUMENTS

| | | | |
|---|---|---|---|
| 0433702 | 6/1991 | European Pat. Off. | 74/512 |
| 1418958 | 10/1965 | France | 74/560 |
| 2222890 | 10/1974 | France | 403/166 |
| 4013284 | 10/1991 | Germany | 74/560 |
| 50-128824 | 10/1975 | Japan | 74/560 |
| 476382 | 11/1975 | U.S.S.R. | 403/166 |

*Primary Examiner*—Vinh T. Luong
*Attorney, Agent, or Firm*—Anthony Luke Simon

[57] ABSTRACT

A mounting for a control pedal in a motor vehicle includes a mounting bracket fixed relative to the vehicle having apertures defining an axis of rotation. The pedal has a hub defining a pivot axis. Spring loaded bearings in the hub are adapted to automatically snap axially outward from a first position to a second position, thereby rotatably connecting the pedal with the bracket, when the pivot axis is aligned with the axis of rotation. The axes are aligned by manipulating the pedal.

10 Claims, 3 Drawing Sheets

_5,398,569_

SNAP-IN PEDAL

TECHNICAL FIELD

This invention relates to foot operated control pedals for use in motor vehicles.

BACKGROUND OF THE INVENTION

Typically, foot operated control pedals in motor vehicles, particularly those for the brakes and the clutch, are rotatably mounted to a bracket in the vehicle by aligning a pivot axis of the pedal with an axis of rotation of the bracket, and passing a bolt through apertures defining those axes. The bolt must also be passed through bushings and spacers disposed between the bracket and the pedal. The bolt is tightened, and the pedal pivots about the bolt.

The use of an axially inserted bolt or shaft has two disadvantages. One is that this method of assembly is inherently difficult because three to four items must be simultaneously axially aligned by an assembler. A second disadvantage is that it is necessary to reserve a large amount of access space for the axial insertion and removal of the bolt. Other disadvantages relate to the use of a threaded fastener. A significant amount of time is required to thread the nut and bolt together. It is also necessary to provide equipment controlling the assembly torque of the joint.

Alternative mounting means to bolts are found in the prior art, but they share the disadvantages of axial manipulation of the mounting means to rotatably secure the pedal to the bracket. The mounting according to this invention rotatably connects the pedal with the bracket by merely manipulating the pedal relative to the bracket to align the pivot axis with the axis of rotation. This invention also eliminates the need for spacers and bushings in the pedal mounting.

SUMMARY OF THE INVENTION

This invention is a new and improved mounting for a control pedal in a motor vehicle. The mounting includes a mounting bracket fixed relative to the vehicle with means defining an axis of rotation. The pedal has means defining a pivot axis. A snap-in connecting means between the pedal and the bracket is adapted to automatically shift a bearing axially from a first position to a second position, thereby rotatably connecting the pedal with the bracket. This occurs when the pivot axis is aligned with the axis of rotation by manipulating the pedal. This pedal mounting significantly reduces the amount of time needed to install a pedal in a motor vehicle. It also reduces the number of parts needed to mount a pedal in a motor vehicle.

DESCRIPTION OF THE PREFERRED EMBODIMENT

Figure 1:
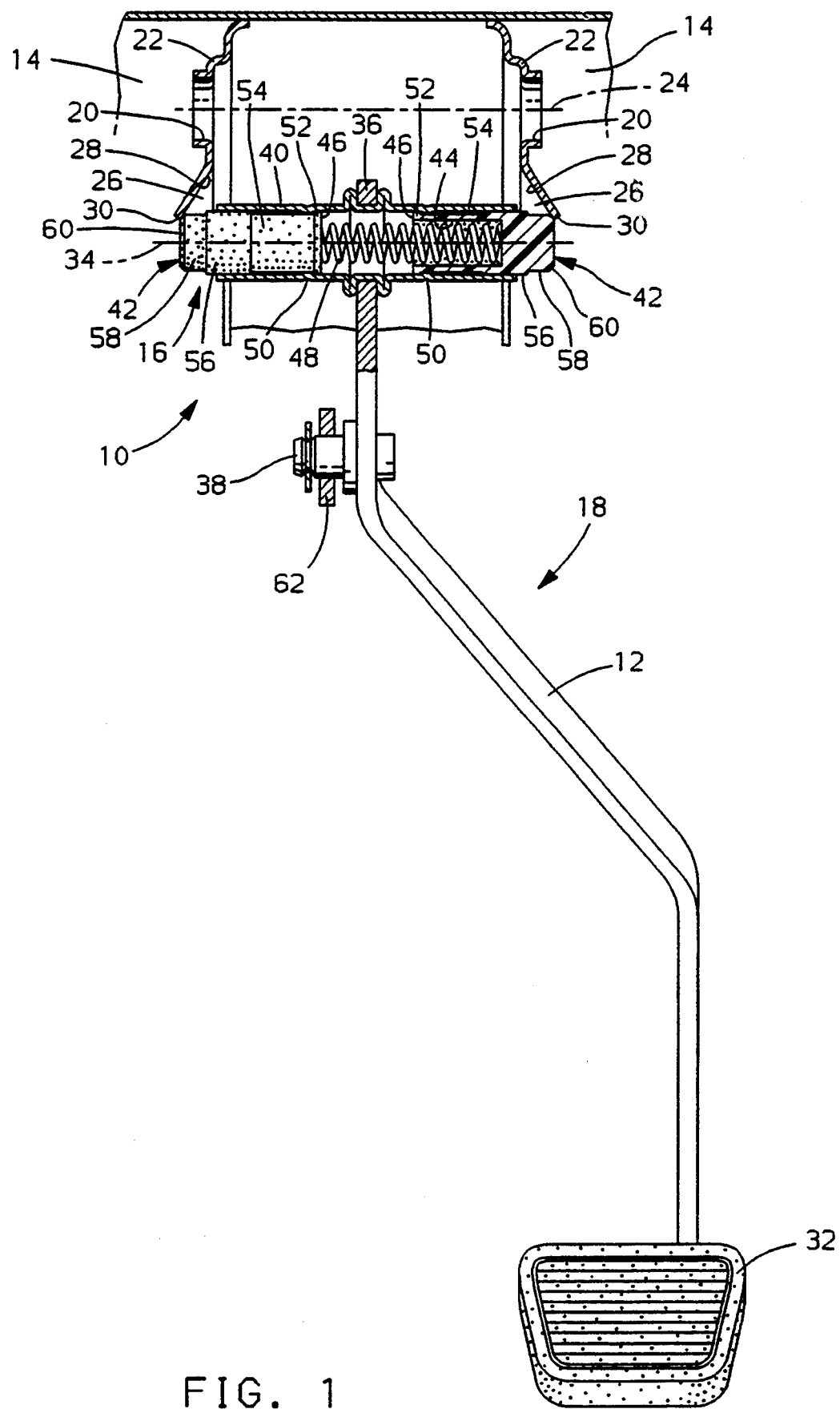
FIG. 1 shows a front view of a pedal assembly disposed just below a bracket.

A mounting 10 for a clutch control pedal 12 for use in a motor vehicle according to this invention, includes a bracket 14, the pedal 12 and a connecting mechanism 16 rotatably connecting the pedal 12 with the bracket 14. The connecting mechanism 16 of this embodiment has been integrated with the pedal 12 into a pedal assembly 18.

The bracket 14, fixed to the vehicle, has a pair of axially aligned apertures 20 in opposed flanges 22 defining an axis of rotation 24 on the vehicle. The bracket flanges 22 each have a facing lead-in channel 26 approximately equal in width to a diameter of the apertures 20 with the distance between bottoms 28 of the channels 26 tapering from a maximum at the edges 30 of the bracket 14 to a minimum at the apertures 20.

The pedal 12 is formed of steel with a rubber foot pad over a first end 32, a pivot axis 34 at the second end 36, and a link pin 38 disposed therebetween.

The connecting mechanism 16 of the pedal assembly 18 includes a steel sleeve acting as a hub 40 axially centered on and rigidly fixed to the pedal 12 and defining the pivot axis 34. The connecting mechanism 16 also includes a pair of identical piston-like bearings 42 disposed within the hub 40. The bearings each have a spring pocket 44 in their facing surfaces 46. A helically coiled compression spring 48 is disposed between the bearings 42 within the spring pockets 44 and forces the bearings 42 apart.

The length of the hub 40 is dependent on the cumulative length of the bearings 42 and the spring 48. An inside diameter A of the hub 40 is larger than the apertures 20 in the bracket 14. Dimples 50 in the hub 40, one on each side of the pedal 12, locally reduce the inside diameter of the hub 40 to limit the travel of the bearings 42 into and out of the hub 40, as explained in more detail below.

The bearings 42 are made of plastic. The bearings 42 are cylindrical and are made as long as practicable to help maintain them coaxial with the hub 40. The diameter of the bearings 42 varies stepwise along their length from a first full diameter portion 52, to a first reduced diameter portion 54, to a second full diameter portion 56, and to a second reduced diameter portion 58.

The first full diameter portion 52 is sized to freely rotate inside the hub 40, and has a short length. The first reduced diameter portion 54 is sized to clear the dimples 50 in the hub 40, and has a length equal to the expected travel of the bearing 42 in the hub 40.

The second full diameter portion 56 is sized to prevent entry into the bracket aperture 20 yet freely rotate inside the hub 40, and has a length sufficient to keep a bearing load per unit of area at or below a magnitude which can be sustained by the plastic. The second reduced diameter portion 58 provides a slight interference fit with the aperture 20 in the bracket 14 and has a length slightly longer than that of the bracket aperture 20. There is a chamfer 60 on an end of the second reduced diameter portion 58. The spring pocket 44 is at the first full diameter portion end of the bearing.

The connecting mechanism 16 is assembled as follows. One of the bearings 42 is dropped into one end of the hub 40 with the first full diameter portion 52 being the first in. The second reduced diameter portion 58 of that bearing 42 extends out of the hub 42 and is pressed on to force the first full diameter portion 52 to snap past the dimples 50.

The spring 48 is placed in the other end of the hub 40 and received by the spring pocket 44 of the bearing 42. Another bearing 42 is placed, spring pocket 44 first, into the hub 40 and over the spring 48. This bearing 42 is pressed further into the hub 40, thereby compressing the spring 48, and snapping the first full diameter portion 52 past the dimples 50. The spring 48 is now captured between the bearings 42 and pushes them away from each other. The dimples 50 limit the outward travel of the bearings 42 in the hub 40 to a position where the second reduced diameter portions 58 extend beyond the hub 40. The pedal assemblies 18 would enter a vehicle assembly plant fully assembled.

At the vehicle assembly plant, the pedal assembly 18 is installed in the bracket 14 as follows. The pedal assembly 18 is gripped in one hand by an installer who manipulates it to align the second reduced diameter portions 58 with the lead-in channels 26 of the bracket 14. The bearings 42 are in an extended second position, fitting between the bottoms 28 of the channels 26 at the edges 30 of the bracket 14, as shown in FIG. 1.

Figure 2:
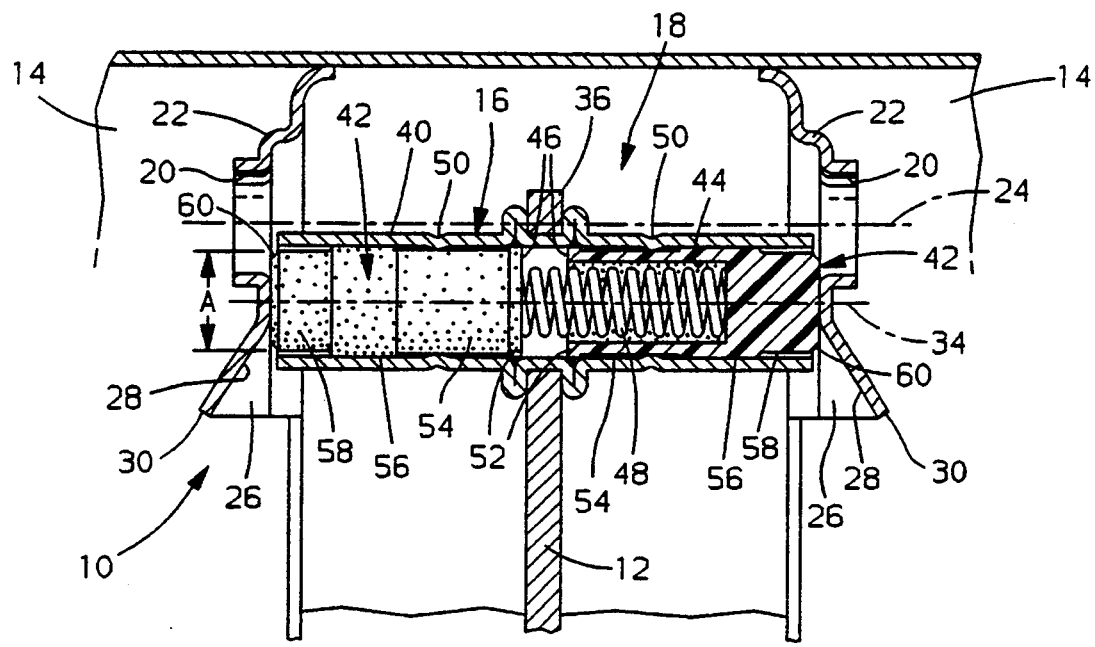
FIG. 2 shows a front view of the pedal assembly with bearings disposed in a lead-in channel.
Figure 3:
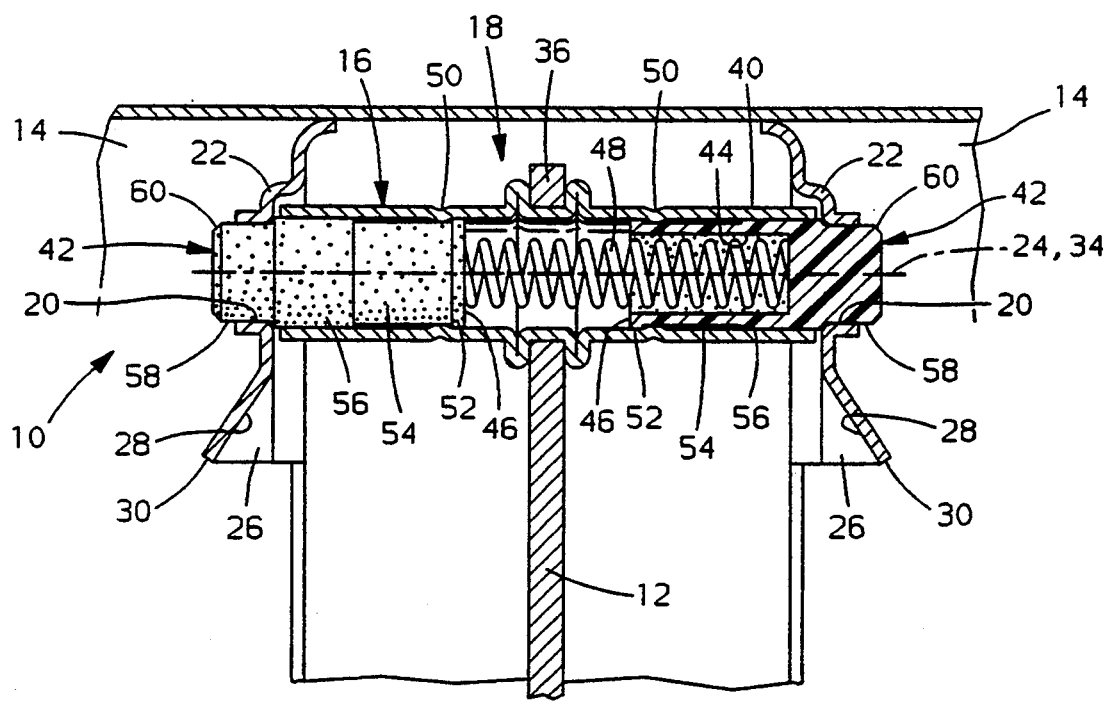
FIG. 3 shows a front view of the pedal assembly installed in the bracket.

The installer pushes the pedal assembly 18 in a direction normal to the axis of rotation 24 forcing the bearings 42 to move through the channels 26 and toward the apertures 20. The bottoms 28 of the channels 26 contact the bearings 42, gradually forcing them into a compressed second position, shown in FIG. 2, thereby compressing the spring 48. When the pedal assembly 18 reaches the installed position where the pivot axis 34 is aligned with the axis of rotation 24, the bearings 42 snap from the compressed position through the apertures 20 to the extended position shown in FIG. 3.

The entry of the bearings 42 into the apertures 20 is facilitated by the chamfers 60 on the bearings 42. The spring 48 forces the second full diameter portions 56 of the bearings 42 to seat against the flanges 22, overcoming the interference between the second reduced diameter portion 58 and the bracket apertures 20. With the bearings 42 thus engaged with the bracket 14, further movement of the pedal 12 relative to the bracket 14 is limited to rotary motion about the axis of rotation 24. The link pin 38 is subsequently connected to a clutch linkage 62.

Figure 4:
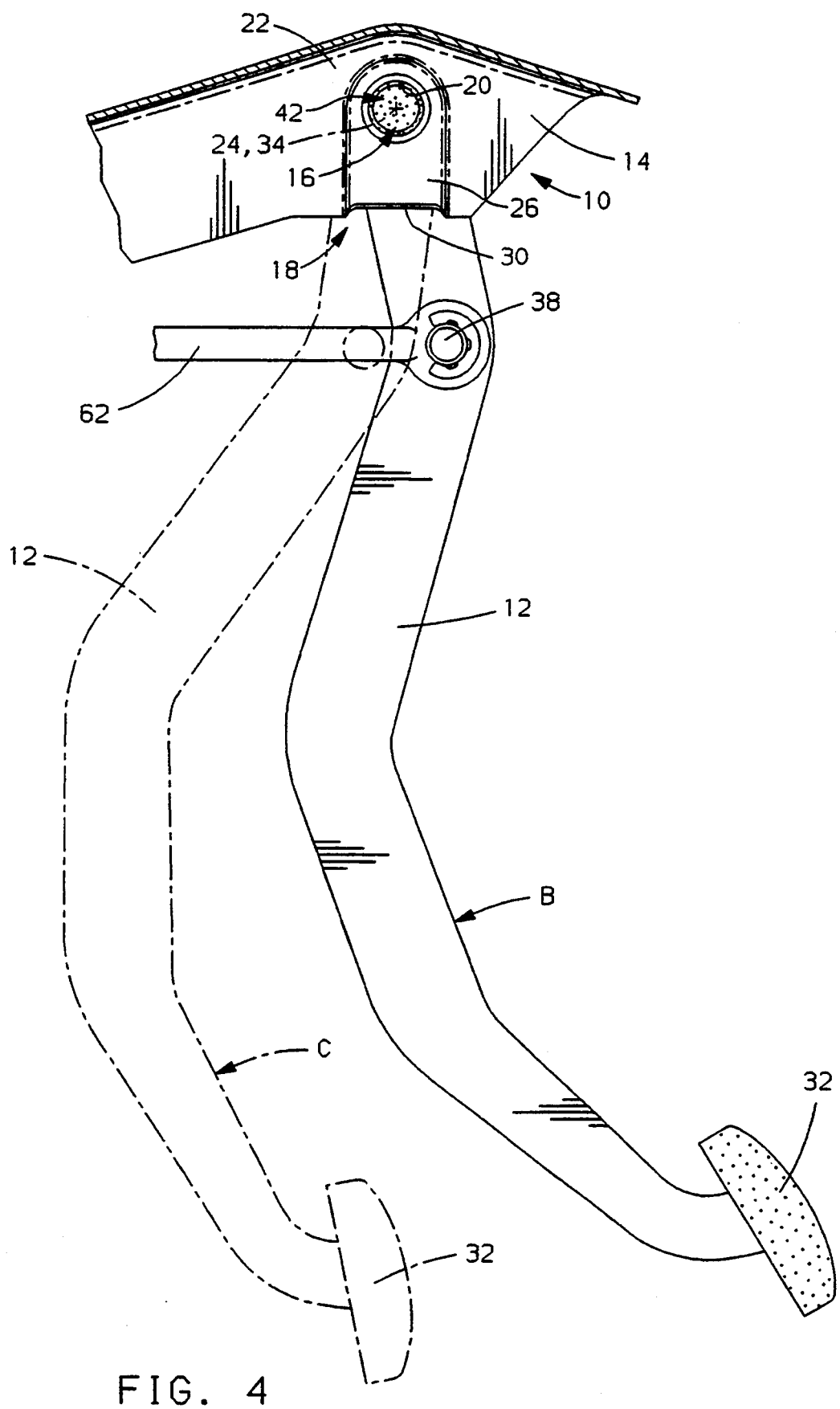
FIG. 4 shows a side view of an installed pedal assembly in an apply position, and in a release position in phantom.

When completely installed, the device works in the following manner. The clutch linkage 62 maintains the pedal 12 in an apply position B, as shown in FIG. 4. A vehicle operator rotates the pedal 12 to a release position C, shown in FIG. 4, by depressing it with his foot.

When the pedal 12 is rotated, the hub 40 rotates with the pedal 12 and the bearings 42 do not. The bearings 42 remain fixed with respect to the bracket 14 due to their interference fit with the apertures 20. The relative rotation between the bearings 42 and the hub 40 causes the second full diameter portion 56 inside the hub 40 to serve as a journal bearing, with its relatively large area keeping the bearing load per unit of area to the magnitude sustainable by the plastic chosen. When the operator lifts his foot from the pedal 12, the pedal 12 is restored to the apply position B by the clutch linkage 62. The bearings 42 continue to remain fixed with respect to the bracket 14 during the return to the apply position B.

It should be noted that the pedal mounting 10 of the present invention significantly reduces the cost of providing a control pedal in a motor vehicle by reducing the amount of time needed to install it, and by reducing the number of parts required for the pedal mounting. The present invention also increases the amount of usable space within the vehicle around the pedal mounting 10 by eliminating the need to provide clearance for axial insertion and withdrawal of the bolt.

The embodiments of the invention in which an exclusive property or privilege is claimed are defined as follows:

1. In a mounting for a control pedal on a motor vehicle for rotation about an axis, the combination comprising:
   a mounting bracket fixed relative to the vehicle and having first and second apertures defining the axis of rotation,
   the pedal having first and second bearings defining a pivot axis and a spring, wherein the first and second bearings are biased by the spring to axially outer positions and wherein the spring is compressible such that opposing forces on the bearings axially moves the bearings into axially compressed positions,
   wherein the spring forces the bearings in the axially outer positions when the pedal is positioned so that the bearings are exterior of the bracket,
   wherein the bracket forces the bearings in the axially compressed positions when the bearings are located within the bracket and not within the first and second apertures, and
   wherein the spring forces the bearings in the axially outer positions when the bearings are in the first and second apertures, whereby the pedal snaps into the bracket.

2. A combination as claimed in claim 1, wherein the bracket includes first and second channels for axially aligning the pivot axis with the axis of rotation and for forcing the bearings into the axially compressed position.

3. A combination as claimed in claim 2, wherein the bearings are rotatively fixed with respect to one of the bracket and the pedal.

4. A combination as claimed in claim 3, wherein the bearings are rotatively fixed with respect to the bracket.

5. In a mounting for a pedal in a motor vehicle for rotation about an axis, the combination comprising:
   a mounting bracket including two apertures defining the axis of rotation, and
   a pedal assembly having:
      a pedal,
      a hub rigidly fixed to the pedal defining a pivot axis, and
      two spring loaded bearings disposed within the hub, wherein the bearings automatically snap outward into the apertures of the bracket from a compressed first position to an extended second position when the bearings are aligned with the apertures, wherein the bearings rotatably connect the pedal with the mounting bracket.

6. The combination as claimed in claim 5, further characterized by the bracket having facing guide channels for forcing the bearings into the compressed first position.

7. The combination as claimed in claim 6, wherein the bearings comprise plastic.

8. The combination as claimed in claim 6, wherein the bearings are rotatively fixed with respect to one of the bracket and the hub.

9. The combination as claimed in claim 8, wherein the bearings are rotatively fixed with respect to the bracket.

10. The combination as claimed in claim 9 further comprising:
    spring pockets in facing surfaces of the bearings, and
    a coil spring disposed between the bearings and having ends disposed within the spring pockets of the bearings, wherein the spring loads the bearings.

* * * * *